US010841458B2

(12) United States Patent
Urano et al.

(10) Patent No.: US 10,841,458 B2
(45) Date of Patent: *Nov. 17, 2020

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Moemi Urano, Tokyo (JP); Mitsuhiro Ono, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 74 days.

This patent is subject to a terminal disclaimer.

(21) Appl. No.: 16/287,824

(22) Filed: Feb. 27, 2019

(65) Prior Publication Data

US 2019/0273843 A1 Sep. 5, 2019

(30) Foreign Application Priority Data

Mar. 2, 2018 (JP) ................................. 2018-037295
Jan. 28, 2019 (JP) ................................. 2019-012304

(51) Int. Cl.
*G06K 9/00* (2006.01)
*H04N 1/60* (2006.01)
(Continued)

(52) U.S. Cl.
CPC ....... *H04N 1/6066* (2013.01); *G06K 9/00624* (2013.01); *G06K 9/00771* (2013.01);
(Continued)

(58) Field of Classification Search
CPC ........... G06K 9/00624; G06K 9/00771; G06K 9/4652; G07D 2205/00; G07D 5/00;
(Continued)

(56) References Cited

U.S. PATENT DOCUMENTS 8,339,666 B2 * 12/2012 Kaneko ................. H04N 1/603
358/1.9
10,157,470 B2 * 12/2018 Mayuzumi .............. G06T 7/207
(Continued)

FOREIGN PATENT DOCUMENTS

EP      3249919 A1   11/2017
GB      2447246 A     9/2008
JP      2003-302354 A 10/2003

OTHER PUBLICATIONS

Rasouli, Amir and John K. Tsotsos, "The Effect of Color Space Selection on Detectability and Discriminability of Colored Objects," arXiv preprint arXiv:1702.05421, 2017. (Year: 2017).*

*Primary Examiner* — Ian L Lemieux
(74) *Attorney, Agent, or Firm* — Canon U.S.A., Inc. IP Division

(57) ABSTRACT

An image processing apparatus includes a conversion unit configured to convert an image in a first color space into an image in a second color space in such a manner that the image in the second color space has a bit depth smaller than a bit depth of the image in the first color space, a first recognition unit configured to perform first recognition processing using the image in the second color space, and a second recognition unit configured to perform second recognition processing on an image area that is determined to be the image area in which the second recognition processing is performed on the image in the first color space based on a result of the first recognition processing.

18 Claims, 12 Drawing Sheets

(51) Int. Cl.
*G06K 9/46* (2006.01)
*H04N 1/00* (2006.01)
*G08B 13/196* (2006.01)
*G07D 5/00* (2006.01)
*H04N 9/64* (2006.01)

(52) U.S. Cl.
CPC ......... *G06K 9/4652* (2013.01); *G08B 13/196* (2013.01); *H04N 1/00209* (2013.01); *H04N 1/60* (2013.01); *G07D 5/00* (2013.01); *G07D 2205/00* (2013.01); *H04N 9/64* (2013.01); *H04N 2201/0084* (2013.01)

(58) Field of Classification Search
CPC .... G08B 13/196; H04N 1/00209; H04N 1/60; H04N 1/6066; H04N 2201/0084; H04N 9/64
See application file for complete search history.

(56) References Cited

U.S. PATENT DOCUMENTS

| | | | |
|---|---|---|---|
| 2005/0157346 A1* | 7/2005 | Kitagawara | H04N 1/62 358/2.1 |
| 2007/0013927 A1* | 1/2007 | Miyahara | H04N 1/6058 358/1.9 |
| 2007/0077987 A1 | 4/2007 | Gururajan | |
| 2010/0158363 A1* | 6/2010 | Jiang | G06K 9/4652 382/165 |
| 2014/0015995 A1 | 1/2014 | Campbell | |
| 2015/0043655 A1* | 2/2015 | Nilsson | H04N 5/91 375/240.26 |
| 2016/0261885 A1* | 9/2016 | Li | H04N 19/587 |
| 2017/0280029 A1* | 9/2017 | Steiner | A61B 8/5261 |
| 2018/0220144 A1* | 8/2018 | Su | H04N 19/30 |
| 2019/0130208 A1* | 5/2019 | Michael | G06K 9/6256 |
| 2019/0273842 A1* | 9/2019 | Ono | H04N 1/6019 |

* cited by examiner

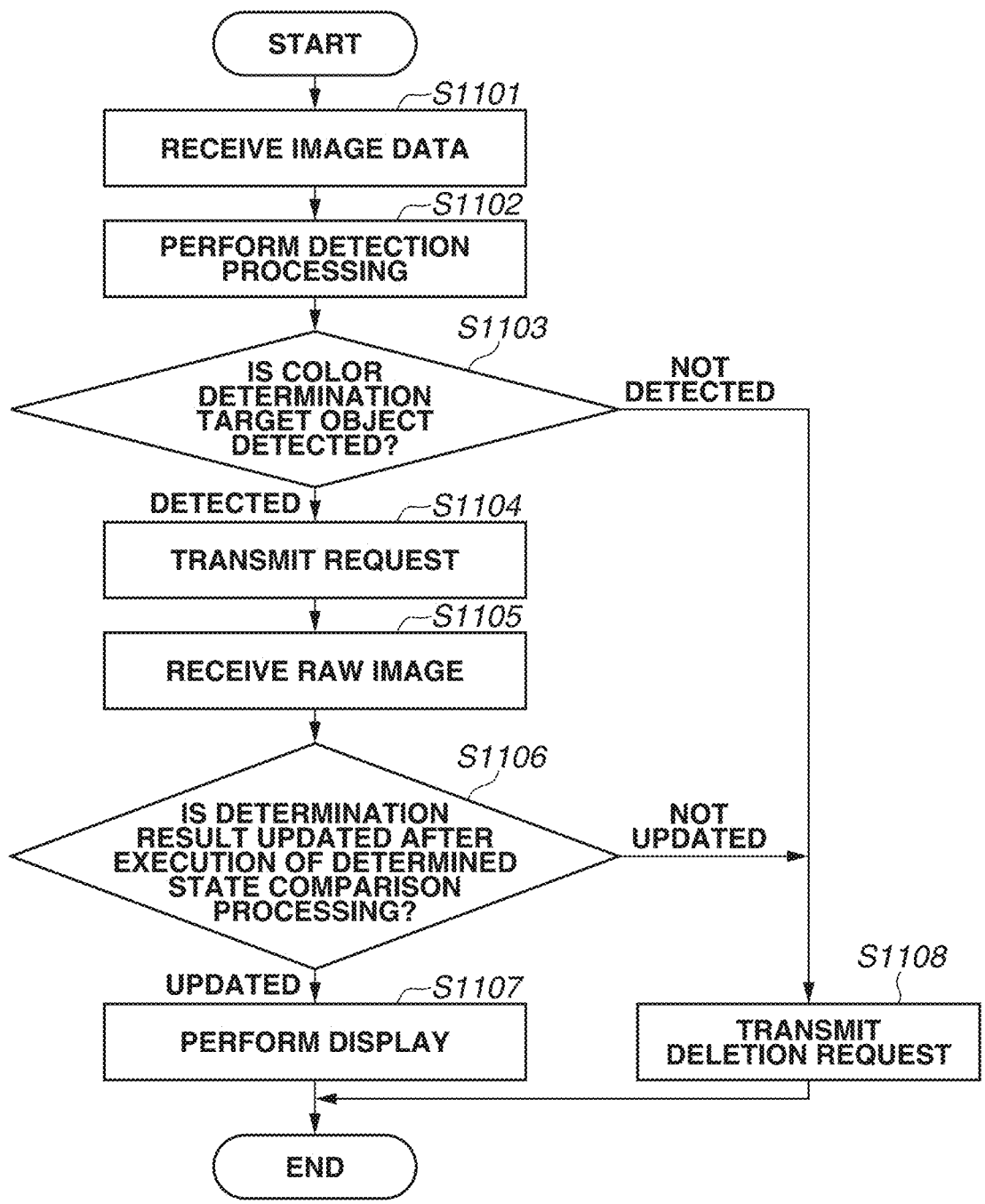

IMAGE PROCESSING APPARATUS, IMAGE PROCESSING METHOD, AND STORAGE MEDIUM

BACKGROUND OF THE INVENTION

Field of the Invention

The present invention relates to an image processing technique for processing an image.

Description of the Related Art

A color reproducibility of image data which is used for a network camera and the like is adjusted in conformity with specifications such as Recommendation BT.709 specified by the International Telecommunication Union-Radiocommunication Sector (ITU-R). A color gamut of a color space is also defined by adjusting the color gamut in conformity with such standardized specifications (hereinafter referred to as standard specifications). Image data in a wide color space outside of the color space of standard specifications is gamut-mapped to a narrow color space of standard specifications.

In the case of specifying an object for making a counterfeiting determination, for example, there is a demand for reproducing colors with high accuracy. High-accuracy color reproduction can be achieved if an image in a color space wider than the color space of standard specifications is used. Japanese Patent Application Laid-Open No. 2003-302354 discusses a method for making a defect determination for a control surface by using a three-dimensional color space coordinate system, which is different from three-dimensional color space coordinates indicated by control surface color information, based on a difference between the control surface color information about a three-dimensional color space coordinate system based on a red, green, and blue (RGB) coordinate system, and preliminarily set non-defective product reference color information.

Although high-accuracy color reproduction can be achieved using an image in a color space wider than the color space of standard specifications as described above, the amount of data required for the image in the wider color space becomes greater than those of the image in the color space of standard specifications due to the bit depth of the image in the wider color space. Accordingly, in the case of transmitting or receiving image data in the wider color space, an occupied part of a communication band increases and a processing load during processing of the image data also increases. Consequently, an occupied capacity of a memory and the like also increases.

Therefore, the present invention is directed to achieving high-accuracy color reproduction while suppressing the amount of data.

SUMMARY OF THE INVENTION

According to an aspect of the present invention, an image processing apparatus includes a conversion unit configured to convert an image in a first color space into an image in a second color space in such a manner that the image in the second color space has a bit depth smaller than a bit depth of the image in the first color space, a first recognition unit configured to perform first recognition processing using the image in the second color space, a control unit configured to determine an image area in which second recognition processing is to be performed on the image in the first color space, based on a result of the first recognition processing, and a second recognition unit configured to perform the second recognition processing on the determined image area of the image in the first color space.

Further features of the present invention will become apparent from the following description of embodiments with reference to the attached drawings.

BRIEF DESCRIPTION OF THE DRAWINGS

FIG. 11 is a flowchart illustrating image processing according to a third embodiment of the present invention.

DESCRIPTION OF THE EMBODIMENTS

Preferred embodiments of the present invention will be described in detail below with reference to the accompanying drawings. Each of the embodiments of the present invention described below can be implemented solely or as a combination of a plurality of the embodiments or features thereof where necessary or where the combination of elements or features from individual embodiments in a single embodiment is beneficial.

According to an embodiment of the present invention, a description will be given of an apparatus that processes an image captured by an image capturing apparatus (hereinafter referred to as a network camera), such as a monitoring camera, that is connected to a network, as an application example of an image processing apparatus. The image capturing apparatus according to the present embodiment is not limited to the network camera. Examples of the image capturing apparatus include a digital single-lens reflex camera, a mirrorless single-lens reflex camera, a compact digital camera, a camcorder, an in-vehicle camera, a medical camera, or an industrial camera. In addition, an image capturing device mounted on a personal digital assistant such as a tablet terminal, a personal handyphone system (PHS), a smartphone, a future phone, or a portable game console may also be used as the image capturing apparatus. The image processing apparatus according to the present embodiment may be included in the image capturing apparatus, such as a network camera, or may be included in a control apparatus dedicated to controlling the image capturing apparatus and receiving and processing image data transmitted from the image capturing apparatus, a personal computer (PC), a personal digital assistance, and the like.

Figure 1:
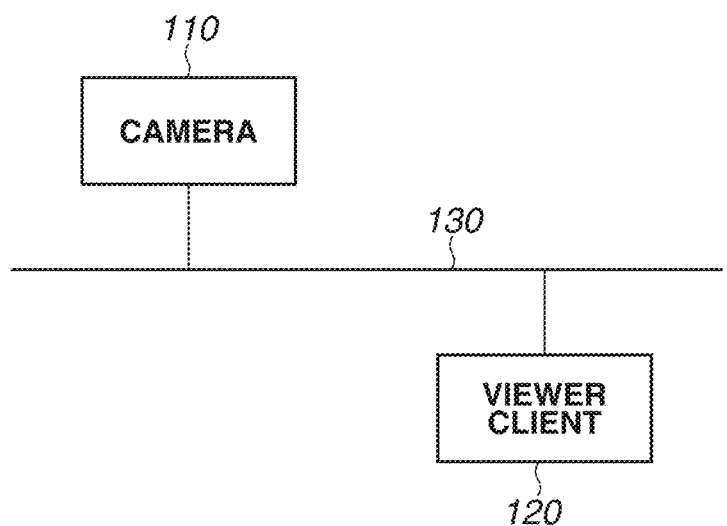
FIG. 1 is a diagram illustrating a schematic system configuration example of a network camera system according to an embodiment of the present invention.

FIG. 1 is a diagram illustrating a schematic configuration example of a network camera system according to the present embodiment.

As illustrated in FIG. 1, the network camera system according to the present embodiment includes a network camera (hereinafter referred to as a camera 110), a viewer client apparatus (hereinafter referred to as a client apparatus 120), and a network 130.

The camera 110 includes a camera and also a communication apparatus that connects to the network 130. The camera 110 transmits image data obtained by capturing images, via the network 130. The camera 110 is configured to communicate image data and also data other than image data. The camera 110 is also configured to capture still images and moving images. A moving image includes images of a plurality of successive frames. An example of still images include images of a plurality of successive frames captured by continuous shooting and the like.

The client apparatus 120 is configured to, for example, access the camera 110 via the network 130, change various settings for the camera 110, and receive image data which is obtained by image capturing using the camera 110 and is transmitted from the camera 110. According to the present embodiment, the client apparatus 120 is also configured to, for example, perform various processes on the image data received from the camera 110 via the network 130, preliminarily stored image data, and the like, and display images based on the processed image data.

The network 130 connects the camera 110 with the client apparatus 120 so that the camera 110 and the client apparatus 120 communicate with each other. The network 130 is composed of, for example, a plurality of routers, switches, or cables, which satisfies a communication specification such as Ethernet®. According to the present embodiment, the communication specification, size, and configuration of the network 130 are not particularly limited as long as the network 130 allows communication between the camera 110 and the client apparatus 120. Accordingly, the Internet, a wireless local area network (LAN), and the like are applicable as the network 130.

Figure 2:
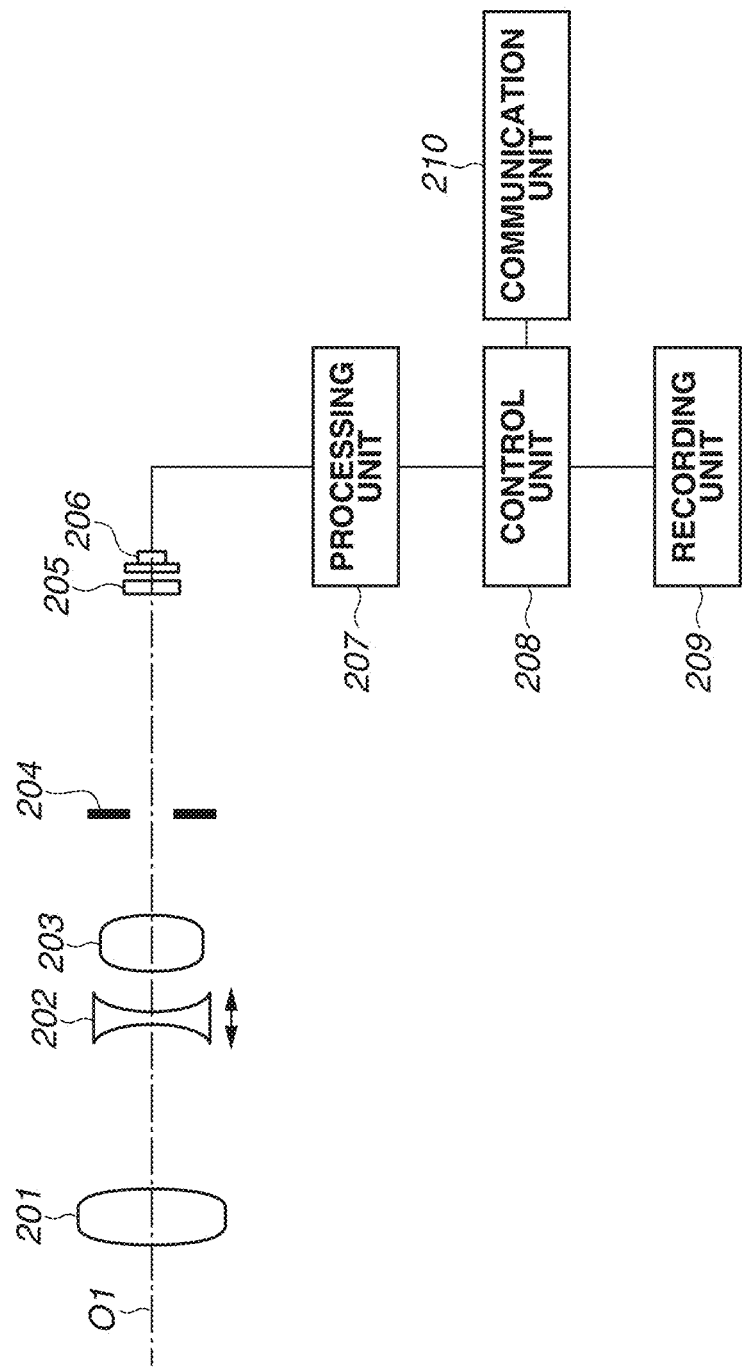
FIG. 2 is a diagram illustrating a schematic configuration example of an image capturing apparatus according to the present embodiment.

FIG. 2 is a diagram illustrating a configuration example of the camera 110 according to the present embodiment.

In FIG. 2, a dashed-dotted line represents an optical axis O1. On the optical axis O1, a lens optical system including an objective lens 201, a focus lens 202, and an image capturing lens 203 is disposed. An aperture 204, a filter 205, and an image sensor 206 are also disposed on the optical axis O1. The image sensor 206 includes a charge-coupled device (CCD) or complementary metal-oxide semiconductor (CMOS) sensor. The image sensor 206 generates an image signal by photoelectrically converting an optical image that has passed through the lens optical system, the aperture 204, and the filter 205 and is formed on an imaging plane, performs analog-to-digital conversion processing on the generated image signal, and outputs the converted signal. Image data output from the image sensor 206 is sent to a processing unit 207. The configuration and operation of the processing unit 207 will be described in detail below.

The image data output from the image sensor 206 is also sent to a control unit 208 via the processing unit 207.

To the control unit 208, a recording unit 209 is connected. The control unit 208 causes the recording unit 209 to record the image data received from the image sensor 206. The control unit 208 may include a central processing unit (CPU). In this case, the CPU of the control unit 208 executes a control program and the like, which is held in, for example, the recording unit 209 or a read-only memory (ROM) (not illustrated), to thereby implement various functional operations in the camera 110. In the camera 110, some or all of the functions of elements associated with signal processing may be implemented in such a manner that the CPU of the control unit 208 executes programs. At least some of the elements of the camera 110 may be operated by dedicated hardware. In this case, the dedicated hardware operates under the control of the control unit 208. The control unit 208 is also connected to a communication unit 210.

The communication unit 210 is connected to the network 130. The communication unit 210 transmits captured image data, metadata on captured images, and the like to the client apparatus 120, which is an external apparatus, via the network 130. The communication unit 210 is configured to receive a command from the client apparatus 120 via the network 130 and transmit the command to the control unit 208. The communication unit 210 is also configured to connect external devices, such as an external storage and an external computer, which are not illustrated, to the control unit 208, and transfer the captured images to the external devices. The external devices, such as an external computer, may transmit a command to the control unit 208 via the communication unit 210 to thereby send an instruction to, for example, start or terminate image capturing.

Figure 3:
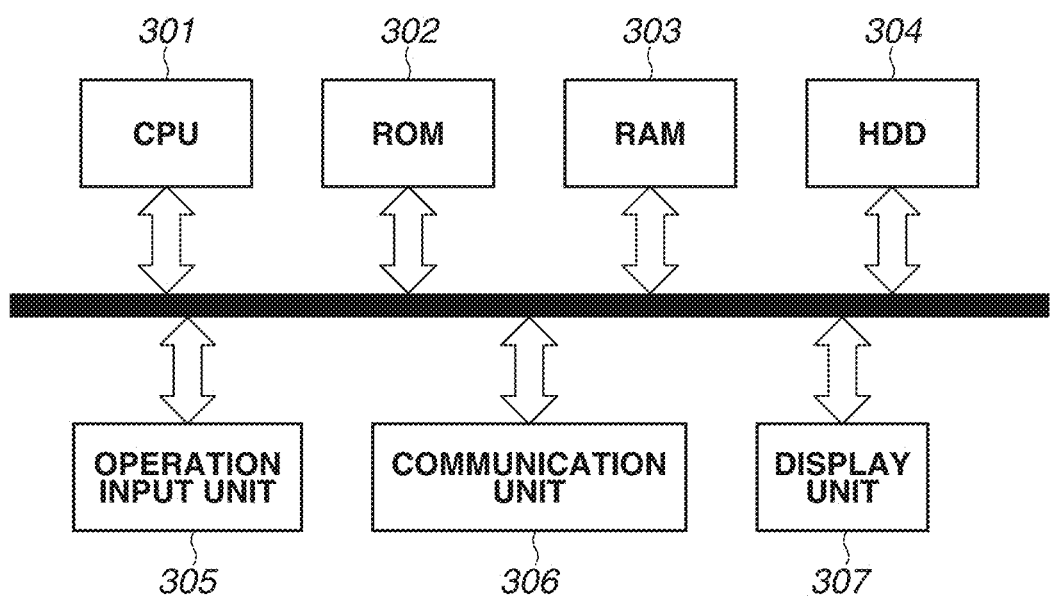
FIG. 3 is a block diagram illustrating a schematic configuration example of a client apparatus according to the present embodiment.

FIG. 3 is a block diagram illustrating a schematic configuration example of the client apparatus 120 according to the present embodiment.

A CPU 301 illustrated in FIG. 3 performs control of the operation in the client apparatus 120 in an integrated manner A ROM 302 is a nonvolatile memory that stores a control program and the like necessary for the CPU 301 to execute processing. A random access memory (RAM) 303 functions as a main memory, a work area, and the like for the CPU 301. Specifically, when executing processing, the CPU 301 loads a necessary program and the like into the RAM 303 from the ROM 302, and executes the program and the like to thereby implement various functional operations and signal processing. Some or all of the functions or elements of the client apparatus 120 can be implemented in such a manner that the CPU 301 executes programs. At least some of the elements of the client apparatus 120 may be operated by dedicated hardware. In this case, the dedicated hardware operates under the control of the CPU 301.

A hard disk drive (HDD) 304 stores, for example, various data and various information necessary for the CPU 301 to perform processing using a program. The HDD 304 also stores, for example, various data and various information that are obtained by processing which has been performed by the CPU 301 using a program and the like.

An operation input unit 305 is an input unit that acquires an operation signal from an operation device, such as a power supply button, a keyboard, or a mouse, which is not illustrated.

A display unit 307 displays a graphical user interface (GUI) and the like for inputting images acquired from the camera 110 and various control parameters and the like for the camera 110.

A communication unit 306 performs processing for communication between the client apparatus 120 and the network 130. Specifically, the communication unit 306 receives image data captured by the camera 110, via the network 130. The communication unit 306 is configured to, for example, transmit a camera setting command and the like generated by the CPU 301 based on the operation signal input via the operation input unit 305, to the camera 110 via the network 130, and receive the response and necessary data other than image data.

Figure 4:
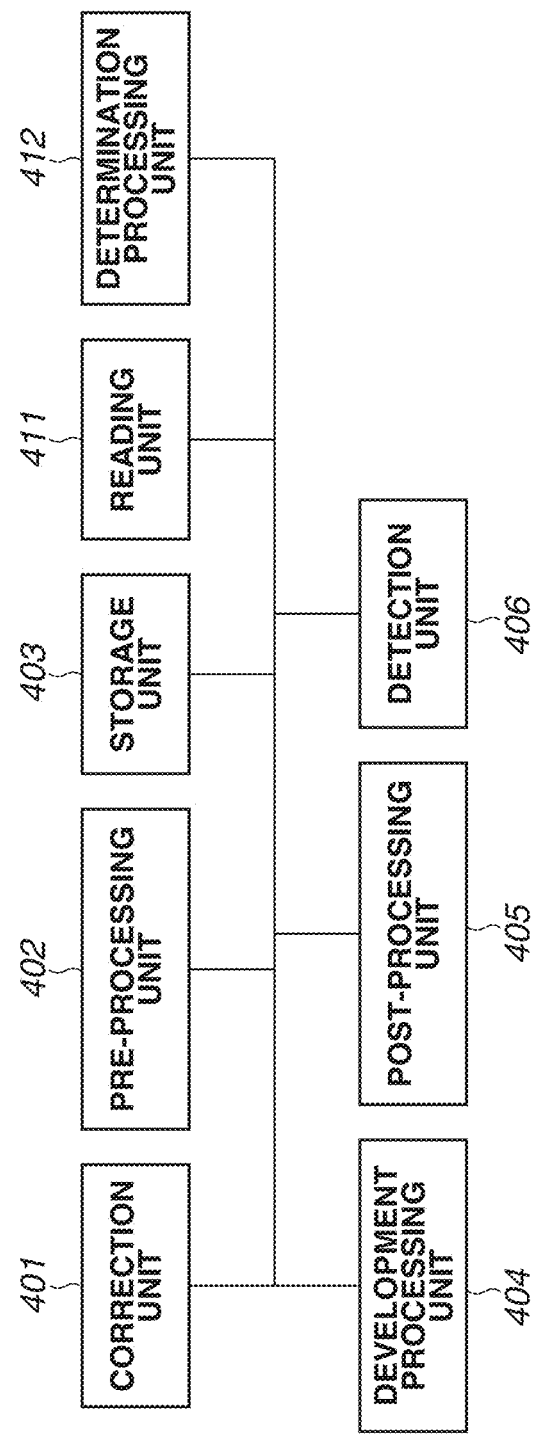
FIG. 4 is a block diagram illustrating a processing unit of the image capturing apparatus according to the present embodiment.

FIG. 4 is a block diagram illustrating an internal configuration example of the processing unit 207 in the camera 110 according to the present embodiment.

A correction unit 401 illustrated in FIG. 4 performs correction processing on input image data depending on characteristics of the lens optical system, sensor characteristics of the image sensor 206, and the like.

A pre-processing unit 402 performs processing on the input image data prior to development processing. Examples of the processing prior to development processing include gain adjustment, noise reduction processing, white balance (WB) adjustment, and sharpness processing.

A recording unit (storage unit) 403 records, on a memory and the like, image data on which pre-processing has been performed by the pre-processing unit 402, image data on which development processing has been performed by a development processing unit 404 to be described below, and the like. The recording unit 403 may include a detachable semiconductor memory such as a so-called secure digital (SD) card.

A post-processing unit 405 performs image processing, such as noise reduction processing and color correction processing, on the image data on which the development processing to be described below has been performed.

A detection unit 406 performs recognition processing for recognizing a specific object or the like from a captured image, an image read by the recording unit 403, and the like, and performs detection processing to detect the recognized area as an image area of the object. The detection processing to be performed by the detection unit 406 will be described in detail below. A reading unit 411 reads an image recorded on the recording unit 403. The reading unit 411 is also configured to read a part of the recorded image (hereinafter known as a partial image). The partial image to be read by the reading unit 411 will be described in detail below.

A determination processing unit 412 performs color determination processing of determining, for example, the image area detected by the detection unit 406, as an area on which color determination processing is to be performed, in the image read by the reading unit 411, and recognizing and determining a color for each pixel in the determined image area. The color determination processing to be performed by the determination processing unit 412 will be described in detail below.

The development processing unit 404 performs development processing, such as demosaic processing, tone curve processing including color space compression, and color space conversion processing, on RAW image data input from the image sensor 206. The development processing to be performed by the development processing unit 404 includes color space conversion processing for converting a color in a color space included in a RAW image (hereinafter referred to as a RAW color space) into a color space of standard specifications (hereinafter referred to as a standard color space) which is a transmission color space to be used when the camera 110 transmits an image.

According to the present embodiment, for example, a color conversion table (three-dimensional lookup table (LUT)) is used for the color space conversion processing to be performed in the development processing by the development processing unit 404.

A use case in which an image captured by the camera 110 according to the present embodiment is transmitted to the client apparatus 120 and is displayed on the client apparatus 120, and precautions for this use case will now be described.

According to the present embodiment, a use case in which importance is placed on colors in an image is described by way of example. An example of the use case in which importance is placed on colors in an image is, for example, the following case. That is, an image of a coin that is used in a recreation hall (such as a casino) is captured by a monitoring camera or the like, and determination of whether the coin is a genuine coin or a fake coin is performed based on the color of the coin in the captured image. In this use case, it is important for the client apparatus 120 to accurately reproduce the color of the genuine coin and the color of the fake coin in the image captured by the camera 110. If the color reproducibility is low, there is a possibility that an authenticity determination to distinguish the genuine from the fake may be erroneously made. Another example of the use case is, for example, the following case. That is, an image of a fruit harvested in a farm is captured, and the degree of maturity of the fruit is determined based on whether the color of the fruit in the captured image matches a target color of a mature fruit or a color of an immature fruit. Also, in this use case, it is necessary for the client apparatus 120 to accurately reproduce the color of the mature fruit and the color of the immature fruit in the captured image. If the colors cannot be accurately reproduced, there is a possibility that a determination as to the degree of maturity of the fruit may be erroneously made.

Meanwhile, when the captured image is transmitted from the camera 110 to the client apparatus 120, the development processing unit 404 of the camera 110 performs color space conversion processing for converting the RAW color space, which is the color space of the captured image, into the standard color space, which is the color space defined in the specifications. Image data subjected to the color space conversion processing is transmitted from the camera 110 to the client apparatus 120. Further, if the color space conversion processing for converting the captured image in the RAW color space into the image in the standard color space is performed in this manner, there is a possibility that the colors in the captured image cannot be accurately reproduced on the client apparatus 120.

It is considered that if image data in the RAW color space captured by the camera 110, i.e., image data with a wide color gamut, is transmitted to the client apparatus 120, the color of the captured image can be accurately reproduced on the client apparatus 120. For example, in the case of SMPTE ST 2065-1:2012 (Academy Color Encoding Specification (ACES)), a color space with a range wider than the range that can be perceived by a human can be defined. However, because the bit depth is high in the image in the wider color space, such as the RAW color space, the amount of data is also large. For example, in the ACES, 16-bit coding floating points are used, which leads to an increase in the amount of data. Accordingly, in the case of transmitting image data in the RAW color space to the client apparatus 120, an occupied part of a communication band increases and a processing load during processing of the image data also increases. Consequently, an occupied capacity of the memory and the like increases. Meanwhile, the bit depth of an image in a narrow color gamut, such as the standard color space, is generally less than the bit depth (smaller bit depth) of an image with a wide color gamut. The amount of data for the image in the narrow color gamut is therefore less than the amount of data for the image in the wide color gamut.

According to the present embodiment, image processing to be described below is performed to achieve high-accuracy color reproduction with a wide color gamut while the amount of data is prevented from becoming large. The image processing according to the present embodiment may be performed by the camera 110, or may be performed by the client apparatus 120.

Figure 5:
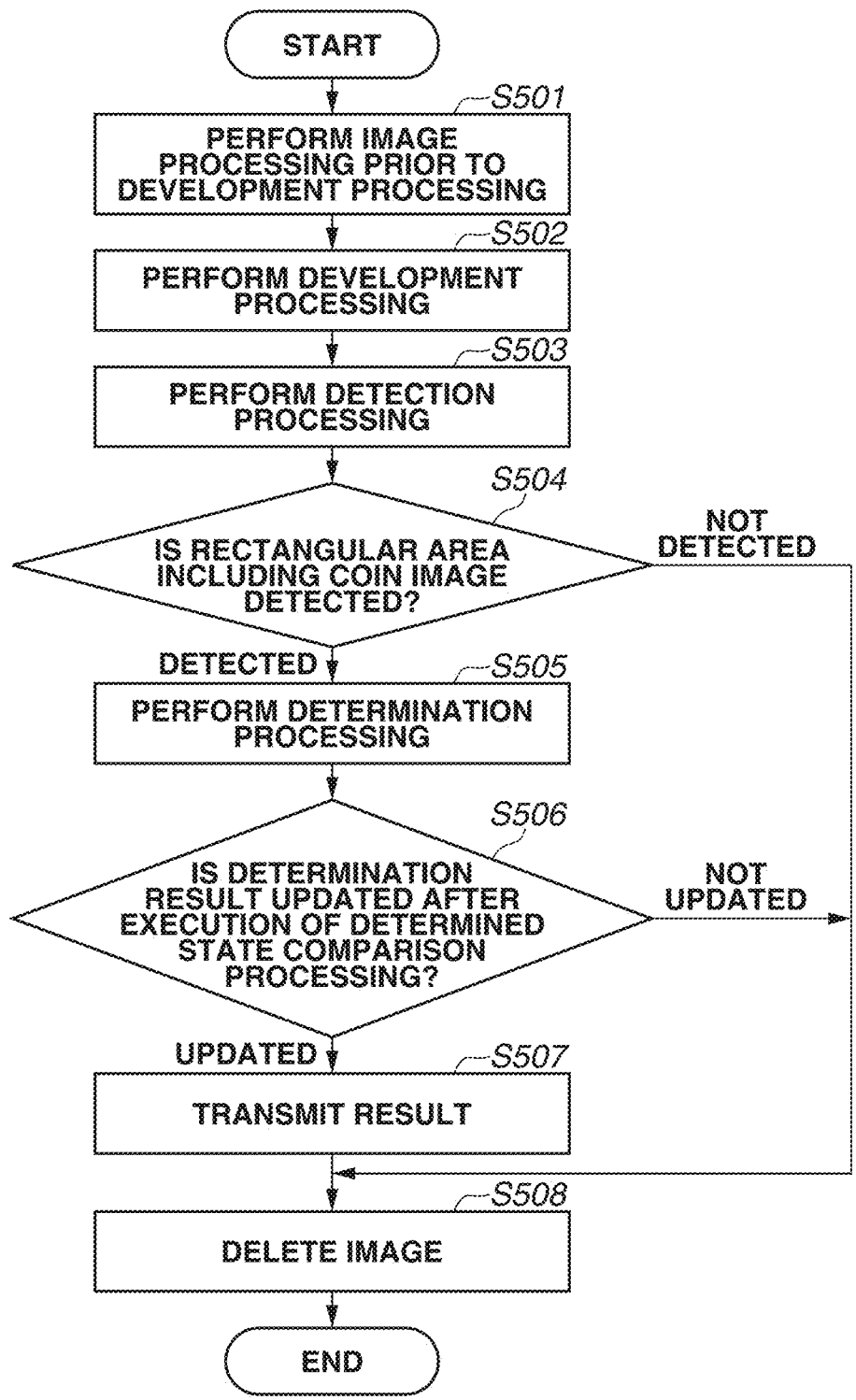
FIG. 5 is a flowchart illustrating image processing according to a first embodiment of the present invention.

A description will be given of a case where the camera 110 performs image processing to achieve high-accuracy color reproduction with a wide color gamut while the amount of data is prevented from becoming large, as a first embodiment of the present invention with reference to a flowchart illustrated in FIG. 5. The processing illustrated in the flowchart of FIG. 5 is performed mainly by the processing unit 207 under the control of the control unit 208 in the camera 110. A case where an authenticity determination to distinguish between a regular coin and a fake coin is made by recognizing the color of each coin in a recreation hall will now be described by way of example.

In step S501 illustrated in FIG. 5, the processing unit 207 performs image processing on an image in the RAW color space (hereinafter referred to as a RAW image) on which development processing has not been performed by the development processing unit 404. The image processing prior to development processing that is performed in step S501 includes correction processing by the correction unit 401, pre-processing by the pre-processing unit 402, and recording processing by the recording unit 403. The correction unit 401 performs correction processing depending on the optical characteristics or sensor characteristics as described above. The pre-processing unit 402 performs pre-processing, such as gain adjustment and noise reduction processing. The image data obtained by the image processing performed before development processing is recorded on the memory or the like (not illustrated) by the recording unit 403. Specifically, the image to be recorded on the recording unit 403 in step S501 is a RAW image which has a wide color gamut and a large bit depth.

Next, in step S502, the processing unit 207 causes the development processing unit 404 to perform development processing and causes the post-processing unit 405 to perform post-processing. The development processing by the development processing unit 404 includes demosaic processing and color space conversion processing as described above. The post-processing by the post-processing unit 405 includes noise reduction processing and color correction processing. The image processing in step S502 results in an image obtained by conversion processing for converting the color space from the RAW color space into the standard color space, i.e., converting the color space from a wide color gamut into a narrow color gamut, or converting the bit depth from a large bit depth into a small bit depth.

In step S503, the processing unit 207 causes the detection unit 406 to perform detection processing for detecting an object from the image obtained by the development processing and the like performed in step S502. According to the present embodiment, the detection unit 406 performs processing for detecting each coin used in a recreation hall as an object. Examples of an algorithm for the detection processing include matching processing in which Scale-Invariant Feature Transform (SIFT) features are used. In the matching processing in which the SIFT features are used, matching processing is performed using SIFT features which are detected in advance from an image of a coin and are registered, and SIFT features extracted from the captured image by the detection unit 406. Then, an image area including an image of a coin in the captured image is detected. The detection algorithm is not limited to matching processing in which SIFT features are used. Alternatively, Local Binary Pattern (LBP) features, Speed-Up Robust Features (SURF), and the like may be used.

The object detection processing in step S503 will now be described with reference to FIGS. 6A and 6B.

Figure 6A:
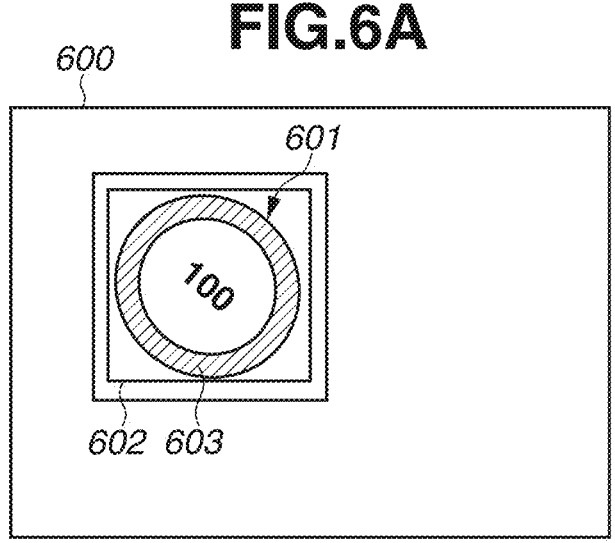
FIGS. 6A and 6B are diagrams used to explain detection processing according to a second embodiment of the present invention.

FIG. 6A is a diagram illustrating an example of a captured image 600. According to the present embodiment, the captured image 600 includes an image of a coin 601. The detection unit 406 extracts a SIFT feature from the captured image 600 and performs matching processing between the extracted SIFT feature and SIFT features previously registered as dictionary data.

Figure 6B:
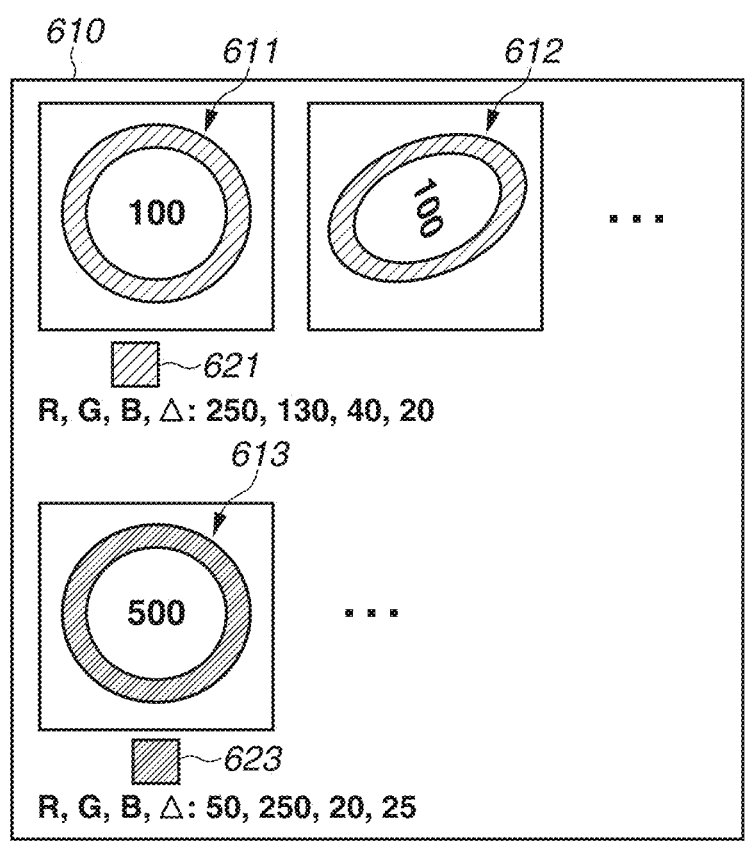

FIG. 6B is a diagram illustrating the content of dictionary data 610. SIFT features for each type of coin, SIFT features for each orientation of various types of coins (coins with varied orientations), and the like are acquired by learning and are registered in the dictionary data 610. In the example of FIG. 6B, a SIFT feature 611 and a SIFT feature 613 represent SIFT features of different types of coins, and the SIFT feature 611 and a SIFT feature 612 represent SIFT features of coins which are the same type and have different orientations.

The detection unit 406 performs matching processing between the SIFT feature extracted from the captured image 600 and each SIFT feature registered in the dictionary data 610, and detects, from the captured image 600, an image area including a coin image having a SIFT feature that substantially matches a registered SIFT feature within a range of a predetermined threshold. In the example of FIG. 6A, the SIFT feature 611 in the dictionary data 610 is selected as the SIFT feature that substantially matches the SIFT feature of the captured image 600. Then, the detection unit 406 acquires, as a detection result, a rectangular image area (hereinafter referred to as a rectangular area 602) including the coin image corresponding to the SIFT feature 611 in the captured image 600.

In the dictionary data 610, color information in the standard color space to be used for determining the color of each coin is also registered in association with the SIFT features for respective types of coins. The color information in the standard color space for each type of coin is color information preliminarily obtained by learning. In the example illustrated in FIG. 6B, color information 621 is associated with the SIFT features 611 and 612 of the same type of coin, and color information 623 is associated with the SIFT feature 613 of the coin which is different from the coin 601. According to the present embodiment, values of three primary colors, i.e., red, green, and blue (R, G, and B), in the standard color space and a variation range A of these values are registered as color information in the dictionary data 610. The variation range A is set to a variation value less than a variation of each color in the standard color space of an assumed fake coin (counterfeit coin). The variation range A may also be set to a color variation that is clearly distinguishable by a human.

Further, the detection unit 406 detects, from the rectangular area 602 including the image of the coin 601 detected from the captured image 600, the position of each pixel having a color within the variation range A centered on the color indicated by the color information 621 associated with the SIFT feature 611 in the dictionary data 610. In the example illustrated in FIG. 6A, a color area 603 indicated by hatching in FIG. 6A is detected from the rectangular area 602. The color area 603, which is used for coin color determination processing in step S505 to be described below, may be preliminarily set by the use's operation and registered in the dictionary data 610.

Next, in step S504, the determination processing unit 412 of the processing unit 207 determines whether the coin is detected in the detection processing in step S503, i.e., whether the rectangular area including the coin image is detected in the detection processing performed by the detection unit 406. If the determination processing unit 412 determines that the coin is not detected, there is no need to perform the subsequent processing. Accordingly, the processing in the camera 110 proceeds to S508. Meanwhile, if the determination processing unit 412 determines that the coin is detected in step S504, the processing proceeds to S505.

In step S505, the determination processing unit 412 performs color determination processing for recognizing and determining colors by using an image with a wide color gamut. The image with a wide color gamut to be used to recognize and determine colors is the RAW image which is recorded on the recording unit 403 in step S501 and on which the development processing has not been performed. In this case, the reading unit 411 reads a partial image in the image with the wide color gamut, which is held in the recording unit 403 and on which the development processing has not been performed, i.e., data at each pixel position corresponding to the color area 603 detected in step S503, and sends the read image to the determination processing unit 412. Further, the determination processing unit 412 performs color determination processing for recognizing and determining colors at each pixel position on the partial image with the wide color gamut which is read by the reading unit 411 based on correspondence with the color area 603 and on which the development processing has not been performed.

In this processing, according to the present embodiment, the determination processing unit 412 obtain a color difference between color of reference image (reference coin) and color of RAW image and performs determination processing using the color difference. The color of reference image may be registered in recording unit 403 beforehand or the color information 621 may be used as the color of genuine image. According to the present embodiment, a conversion into an L*a*b* space is performed using a color conversion profile from RGB values to the L*a*b* space for the RAW image on which the development processing has not been performed, and a determination is made on colors obtained by the conversion. The color conversion profile is a conversion equation for associating device-independent color spaces based on signal values for the RAW image as device colors used by the image sensor 206, or is a description of a conversion table which represents the conversion and is preliminarily created as an LUT. According to the present embodiment, for example, a color difference in the color space of CIE ΔE1976 is used as the color difference. Alternatively, CIE ΔE1994, CIE ΔE2000, and the like may be used, and color differences which have not been standardized may also be used.

In step S506, the determination processing unit 412 performs determined state comparison processing. According to the present embodiment, the determined state comparison processing is performed for selecting a frame including a coin image suitable for determination from among a plurality of frames in which the coin image is detected in a moving image. According to the present embodiment, the determination processing unit 412 selects, as a frame suitable for determination, a frame in which a larger number of pixels each having a color within the variation range A centered on the color information described above in step S503 are detected.

More specifically, according to the present embodiment, the processing unit 207 stores pixels detected in a temporally previous frame in the moving image, the number of the detected pixels, and information about the type of each coin detected in the previous frame in, for example, the recording unit 403 as information about previous determination results. The determination processing unit 412 compares the number of pixels detected in the current frame with the number of pixels detected in the previous frame, to thereby determine whether the number of pixels detected in the current frame is greater than the number of pixels detected in the previous frame. Further, the determination processing unit 412 determines whether the number of pixels detected in the current frame is more than or equal to a predetermined threshold, and also determines whether the type of the coin detected in the current frame matches the type of the coin detected in the previous frame. If the number of pixels detected in the current frame is greater than the number of pixels detected in the previous frame, the number of pixels detected in the current frame is more than or equal to the predetermined threshold, and the type of the coin detected in the current frame matches the type of the coin detected in the previous frame, the determination processing unit 412 determines that the current frame is a more suitable one. If the determination processing unit 412 determines that the current frame is a more suitable one, the information held in the recording unit 403 is updated, as a new determination result, with information about the pixels detected in the current frame, the number of the detected pixels, the type of the coin detected in the current frame, and the like.

As described above, when the determined state comparison processing in step S506 is carried out and the determination result is updated by the determination processing unit 412, the processing of the processing unit 207 proceeds to S507. In the other cases, i.e., when the determination result is not updated, the processing of the processing unit 207 proceeds to S508.

In step S507, the processing unit 207 sends information about the processing result obtained in each processing described above to the control unit 208. Accordingly, the control unit 208 transmits the information about the processing result from the communication unit 210 to the client apparatus 120. The information about the processing result to be transmitted in this case includes rectangular information indicating the rectangular area 602 obtained in the detection processing in step S503, a RAW image area obtained by clipping the rectangular area 602 from the image recorded on the recording unit 403 in step S501, and color difference information obtained in the color determination processing in step S505. The control unit 208 transmits the pieces of information about the processing result from the communication unit 210 to the client apparatus 120 in such a manner that the information is associated with the image (frame) in the standard color space.

After the control unit 208 transmits the information about the processing result to the client apparatus 120 in step S507, the control unit 208 deletes the image area other than the RAW image area corresponding to the rectangular area 602 in the RAW image recorded on the recording unit 403. Further, after receiving a reception complete notification from the client apparatus 120, the control unit 208 deletes the RAW image area obtained by clipping the rectangular area 602 from the image recorded on the recording unit 403 in step S501.

Next, in step S508, the control unit 208 deletes the image recorded on the recording unit 403. The image deleted in step S508 is the RAW image recorded on the recording unit 403 in step S501. Specifically, because the information has been transmitted to the client apparatus 120 as described above, unnecessary RAW images are deleted from the recording unit 403 in the subsequent processing. Consequently, an occupied storage capacity of the memory or the like of the recording unit 403 can be reduced, and a capacity required for smoothly performing the subsequent processing can be ensured.

In the client apparatus 120 which has received the information about the processing result from the camera 110 as described above, an image or the like based on the received information about the processing result is displayed on a monitor, a display, or the like of the display unit 307 in accordance with the processing and control operation by the CPU 301. According to the present embodiment, the CPU 301 of the client apparatus 120 superimposes the image or the like on the captured image in the standard color space sent from the camera 110, based on the information about the processing result, and displays the superimposed image or the like on the screen of the display unit 307.

Specifically, based on the received information about the processing result, the CPU 301 displays, on the screen of the display unit 307, the coin detected from the captured image, the area in which color determination processing is performed on the detected coin, and the result of the color determination processing. Examples of the display are as follows: display in which a rectangular area that includes the detected coin is surrounded by a frame, and display in which a display effect, such as coloring painting, or blinking, is provided depending on the result of the coin color determination processing. Such displays may be performed, for example, when a user of the client apparatus 120 performs selection processing by clicking or the like through the operation input unit 305. Similarly, the color determination result may be displayed for example, in another window frame, in a surrounded frame, in different colors, or with a blinking display effect. Such displays may be performed, for example, when the user performs selection processing by clicking.

Figure 7A:
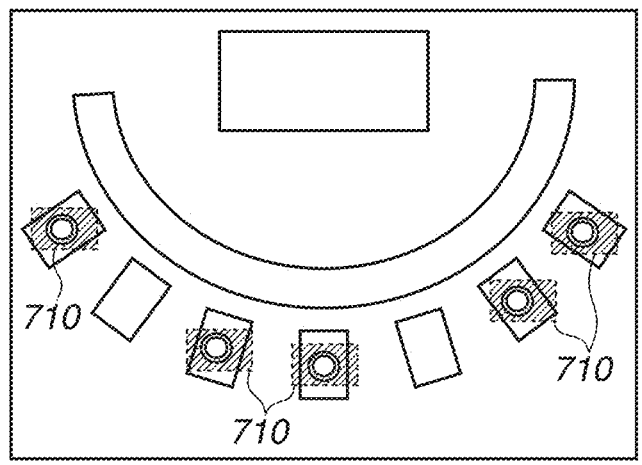
FIGS. 7A, 7B, and 7C are diagrams illustrating display examples.
Figure 7B:
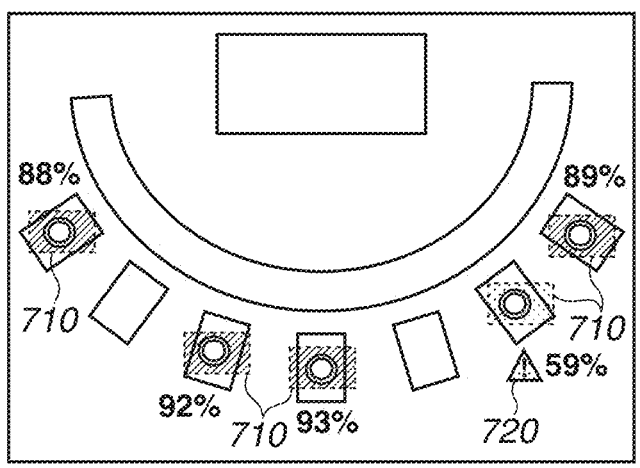
Figure 7C:
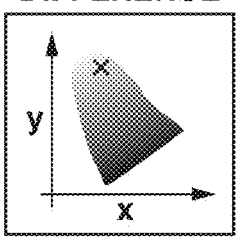

FIGS. 7A, 7B, and 7C are diagrams illustrating examples of a display screen on which display based on the processing result is performed, for example, when the user performs selection processing by clicking. In the case of performing display on the screen of the display unit 307 based on information about the processing result, the CPU 301 causes the above-described rectangular area to be displayed using, for example, each frame 710. FIG. 7A is a diagram illustrating an example of the display based on the information about the processing result, in which each of the frames 710 corresponds to a different one of the rectangular areas, as indicated by a dotted line, and hatching are displayed. Further, the CPU 301 causes the display screen of the display unit 307 to display the information indicating the color determination result described above. The CPU 301 may determine, as an example of the information indicating the color determination result, a coincidence with the color of the genuine coin based on the color determination result, and may display numbers indicating the coincidence. FIG. 7B is a diagram illustrating an example in which numbers indicating the coincidence with the color of the genuine coin are displayed for each of the frames 710 illustrated in FIG. 7A. In addition, the CPU 301 may generate, for example, numerical values indicating a color difference and may display the generated numerical values. Alternatively, the CPU 301 may generate a chromaticity diagram in which the color information itself is plotted and may display the generated chromaticity diagram. FIG. 7C is a diagram illustrating a display example in which the color information itself is plotted on a chromaticity diagram. Further, the CPU 301 may preliminarily set the coincidence estimated from the color difference, and may display the coincidence as numerical values. Alternatively, the CPU 301 may display a color frequency previously determined, and may display a color deviation previously determined. A threshold for the coincidence may be set by the user, and when the coincidence generated as described above reaches the threshold, the CPU 301 may automatically display or issue an alert 720 to send a notification to the user. In addition, the user can select any one of the display methods using, for example, the operation input unit 305 of the client apparatus 120.

In the dictionary data according to the embodiment described above, image capturing conditions, illumination conditions, and the like for the camera 110 are not particularly considered. However, for example, the dictionary data may be prepared by capturing images of an object to be determined under a plurality of different image capturing conditions, illuminance conditions, and the like, and by preliminarily learning the captured images. For example, the dictionary data is prepared by preliminarily learning a scene in which image capturing conditions, such as an angle of view, panning, and tilting of the camera 110, are changed, a scene in which an illuminance is changed (e.g., a scene in which a bright object moves within the screen), and the like. The use of such dictionary data makes it possible to perform color determination processing and coincidence calculation accurately even when the image capturing conditions, illuminance conditions, or the like are different.

In the first embodiment as described above, the area in which color determination processing is to be performed is detected from the image in the standard color space, and high-accuracy color recognition and color determination processing using an image in the RAW color space with a wide color gamut is performed on the detected area. Consequently, according to the first embodiment, it is possible to achieve high-accuracy color reproduction with a wide color gamut while reducing the amount of processing data.

A second embodiment of the present invention will be described with reference to the drawings. The present embodiment illustrates an example in which a camera having panning, tilting, and zooming (PTZ) functions mounted thereon is used. Components and processes including the same functions as those of the first embodiment are denoted by the same reference symbols. Descriptions of the components having the same configuration or function will be omitted, and parts inherent in the present embodiment will be mainly described. The camera according to the present embodiment includes PTZ functions. Accordingly, a PTZ control unit will be described with reference to FIGS. 8, 9, 10A, 10B, and 10C.

Figure 8:
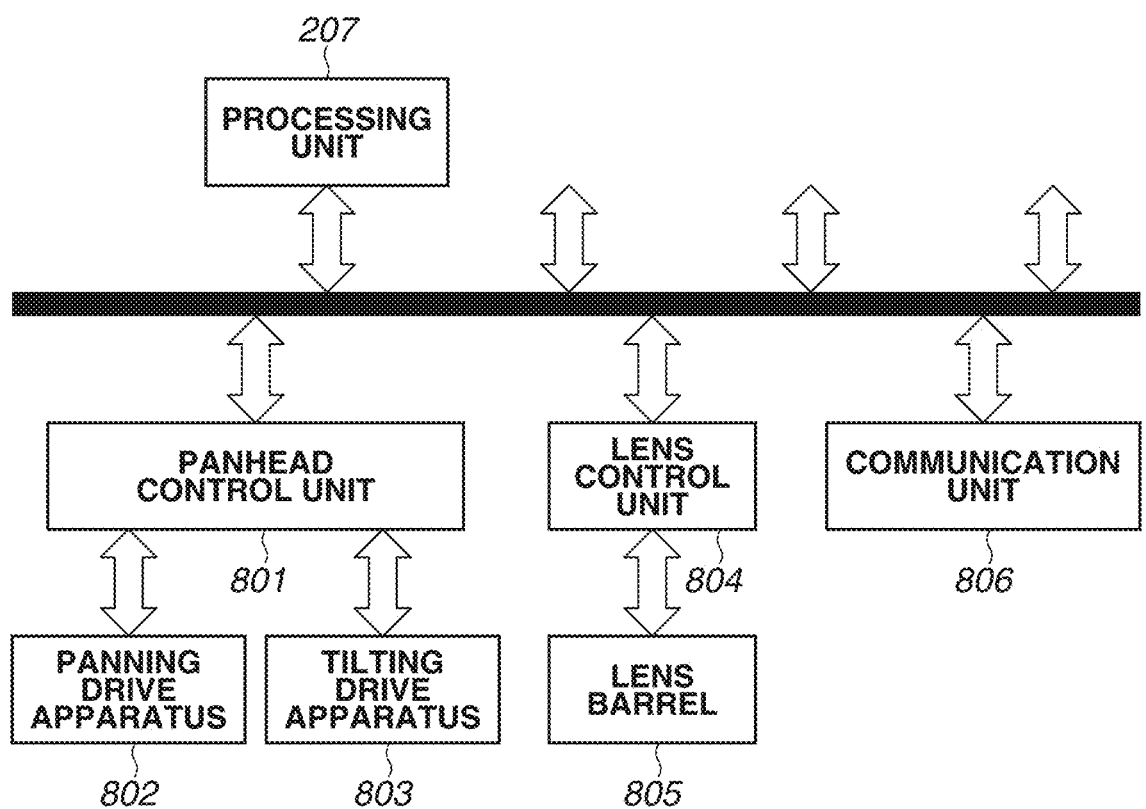
FIG. 8 is a diagram illustrating a configuration example for panhead control.

First, FIG. 8 is a diagram illustrating a configuration for PTZ control. The image capturing apparatus controls a panning drive apparatus 802 and a tilting drive apparatus 803 via a panhead control unit 801 to determine an image capturing direction. The image capturing apparatus also controls a lens barrel 805 via a lens control unit 804. A panhead control and a lens control are performed depending on the detection result in step S503, but instead may be instructed by a user's operation.

Figure 9:
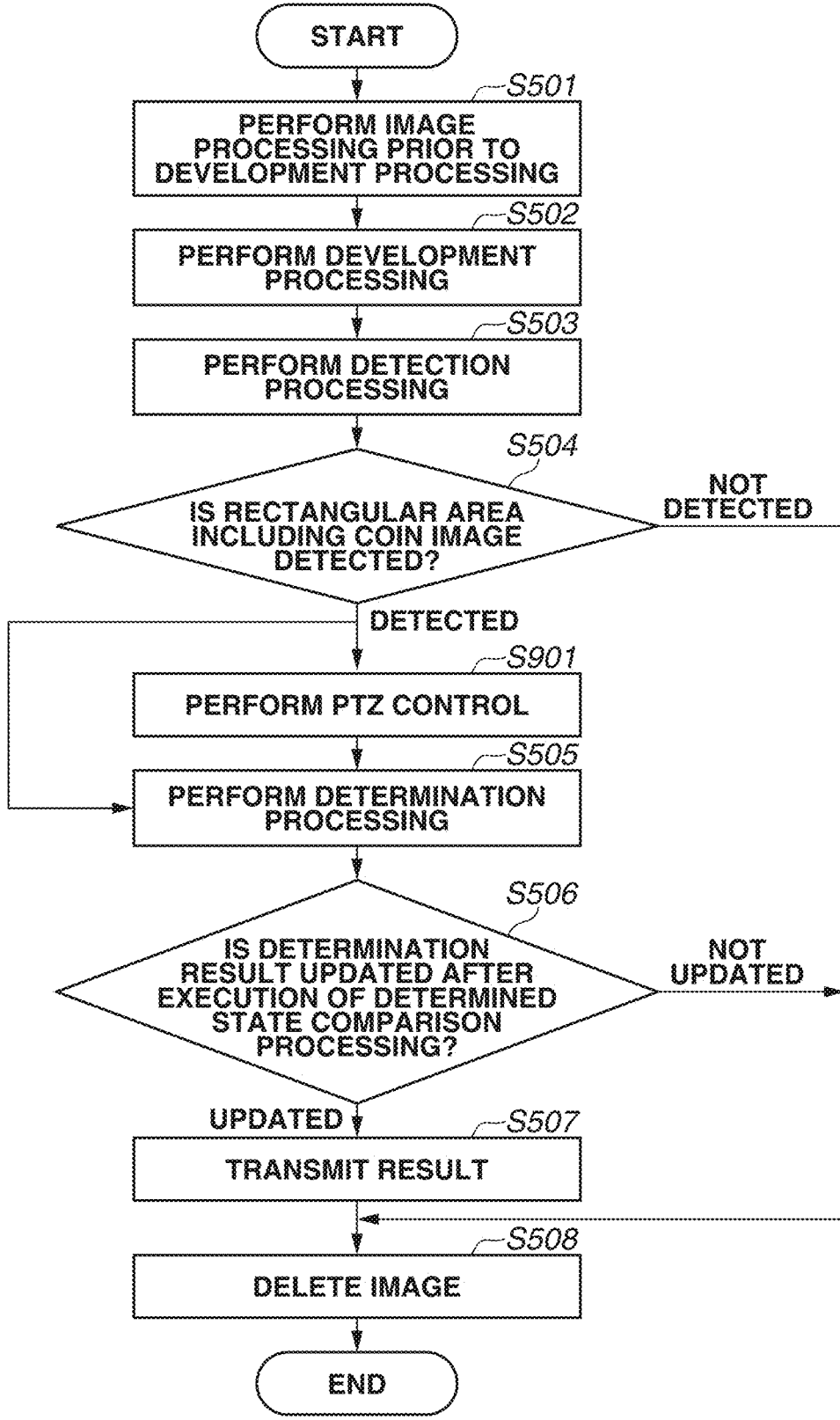
FIG. 9 is a flowchart illustrating image processing according to the second embodiment.
Figure 10A:
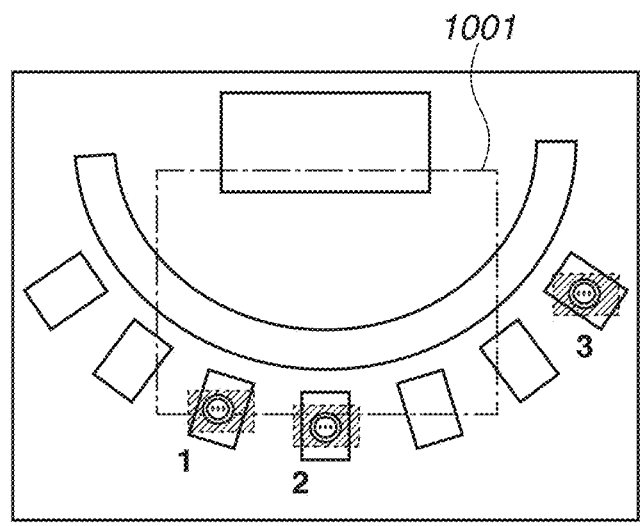
FIGS. 10A, 10B, and 10C are diagrams used to explain the detection processing according to the second embodiment.
Figure 10B:
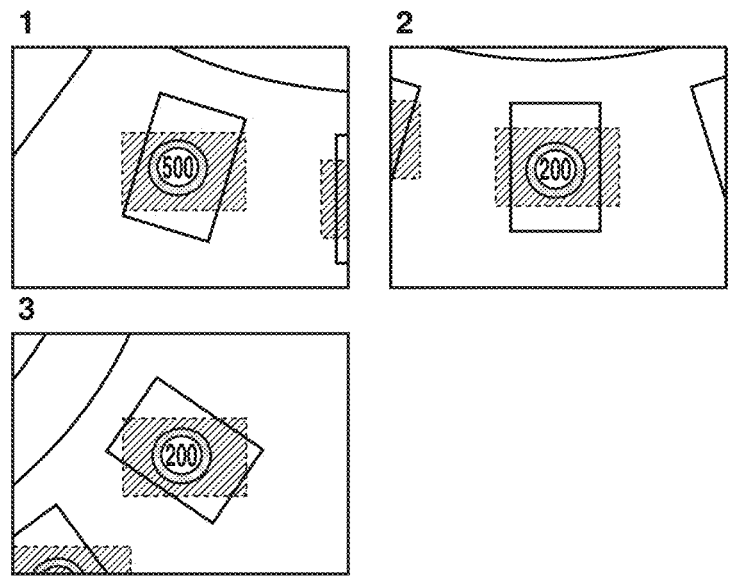

FIG. 9 is a flowchart schematically illustrating processing which is performed by the network camera system according to the present embodiment. Processing from S501 to S504 is similar to that of the first embodiment, and thus descriptions thereof are omitted. In the case where the coin is detected in step S504, if the pixel position extracted in step S503 does not fall within a predetermined ratio (e.g., less than or equal to 70%) from the center of the angle of view, or if the number of pixels is less than or equal to a predetermined threshold, the image capturing apparatus according to the present embodiment performs PTZ control in step S901. For example, when an image as illustrated in FIG. 10A is acquired, the image can be used for detecting a coin. However, since the detected coin is not positioned within a predetermined angle of view 1001, the image capturing apparatus performs PTZ control in such a manner that the coin is located at a position suitable for color determination processing as illustrated in FIG. 10B.

According to the present embodiment, PTZ control for color determination processing is performed in a descending order of value of coins among coins of the type of which has already been determined. To rapidly acquire the color determination processing result, the PTZ control may be performed in an order starting from a coin that is closest to the center of the angle of view in such a manner that PT driving can be performed in a shortest path. Alternatively, the order of coins to be subjected to PTZ control may be designated by the user. The order of coins to be determined by PTZ control, or an order mode is determined to thereby allow the user to rapidly acquire necessary information. Step S505 and subsequent steps are similar to those of the first embodiment, and thus descriptions thereof are omitted.

Figure 10C:
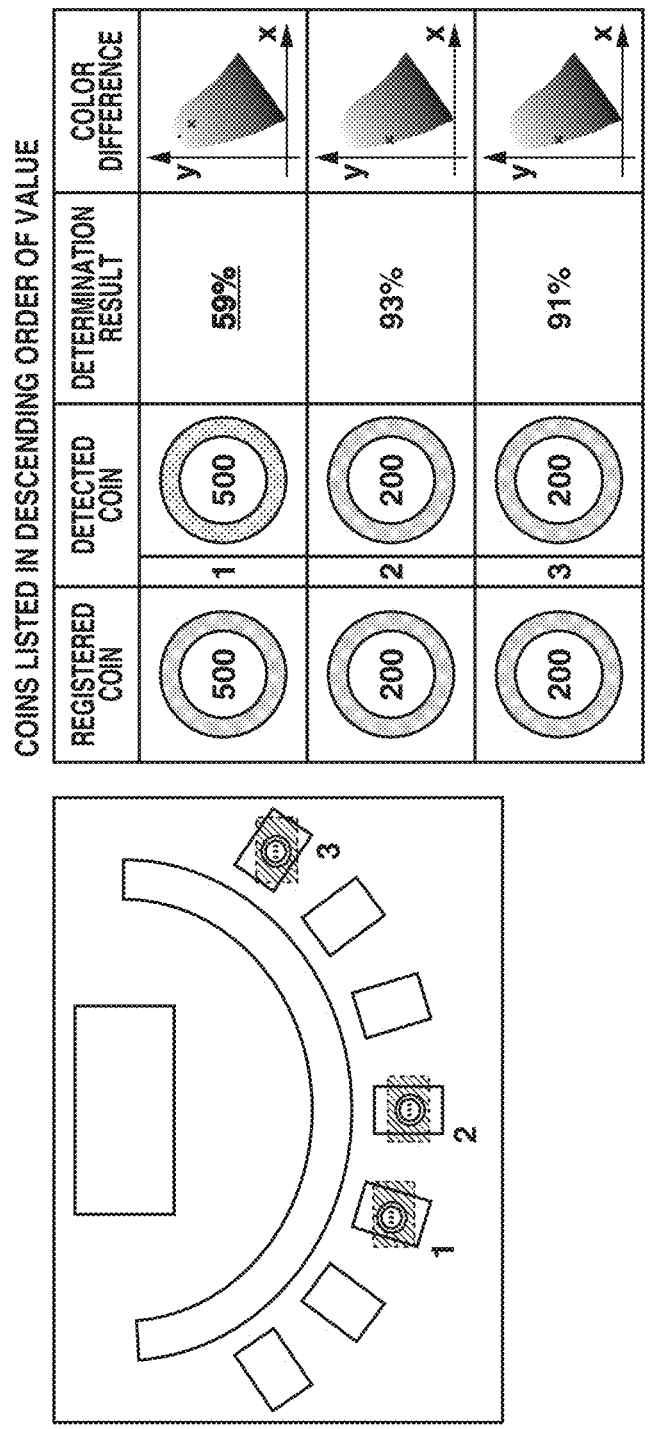

FIG. 10C is a diagram illustrating an example of a user display screen to be displayed when coins are detected and PTZ control is performed. In this example, similar to the first embodiment, the detection result is displayed in a superimposed manner, the determination result is compared with each of an image of a reference coin preliminarily registered and the image of each detected coin, and the determination result and the color difference comparison result are displayed. As a matter of course, displays similar to those of the first embodiment may also be performed.

Like in the present embodiment, when the camera includes PTZ functions, PTZ control is performed on the camera in such a manner that the selected determination area is located at the center of the image and a sufficient number of pixels are obtained to thereby prevent a deterioration in the accuracy of the color determination result due to the effect of a chromatic aberration or a decrease in marginal illumination.

An example in which the client apparatus 120 performs image processing to achieve high-accuracy color reproduction with a wide color gamut while preventing the amount of data to be increased will be described as a third embodiment of the present invention. According to the third embodiment, the client apparatus 120 performs object detection processing, color determination processing, and the like in the same manner as described above.

FIG. 11 is a flowchart illustrating an image processing procedure to be performed by the client apparatus 120 according to the third embodiment. The processing illustrated in the flowchart of FIG. 11 is mainly performed by the CPU 301 by executing a program in the client apparatus 120. The third embodiment also illustrates an example in which a coin authenticity determination is made, like in the first embodiment described above.

Prior to the processing of the flowchart illustrated in FIG. 11, the camera 110 performs development processing, like in step S501 described above. Image data in the standard color space on which the development processing has been performed is then transmitted to the client apparatus 120. In step S1101, the CPU 301 of the client apparatus 120 receives the image data in the standard color space on which the development processing has been performed from the camera 110 via the communication unit 306.

In step S1102, the CPU 301 detects an object having the color area to be subjected to color determination processing from the received image. As the object detection processing, processing similar to the processing performed by the detection unit 406 of the camera 110 according to the first embodiment is performed. Since, according to the third embodiment, the client apparatus 120 performs the detection processing, it is also possible to detect each object from, for example, images sent from a plurality of cameras. Further, the dictionary data (e.g., the dictionary data 610) that is used when the object is detected from images sent from the plurality of cameras can be standardized. Furthermore, the dictionary data can be collectively updated, which leads to an increase in the efficiency of update processing and the like.

In step S1103, the CPU 301 determines whether one or more objects having the color area to be subjected to color determination processing in step S1102 are detected. If one or more objects having the color area to be subjected to color determination processing are detected, the processing proceeds to step S1104. Meanwhile, if no target object is detected, the processing proceeds to S1108.

In step S1104, the CPU 301 requests the camera 110 to transmit a RAW image via the communication unit 306. In this case, the CPU 301 transmits, to the camera 110, a transmission request including frame information (e.g., information, such as a frame number, with which a frame can be specified in a moving image) about the requested RAW image, and positional information about the object detected in the image in step S1102. In response to receipt of the transmission request, the camera 110 transmits the RAW image data corresponding to the transmission request to the client apparatus 120. In this processing, the camera 110 sends, to the client apparatus 120, image data on the RAW image area corresponding to the positional information about the object in the RAW image depending on the frame information and positional information in the received transmission request. The camera 110 may send RAW image data corresponding to one image depending on the frame information. However, in such a case, the amount of data becomes larger than the amount of data of a case in which image data on the RAW image area corresponding to the positional information about the object is sent. Accordingly, in step S1105, the CPU 301 of the client apparatus 120 receives the RAW image sent from the camera 110 via the communication unit 306.

In step S1106, the CPU 301 performs color recognition and determination processing and determined state comparison processing using the RAW image area received in step S1105, to thereby perform coin authenticity determination processing. The color recognition and color determination processing performed in step S1106 is processing similar to step S505 according to the first embodiment described above, and the determined state comparison processing is processing similar to S506 according to the first embodiment described above. Further, when the CPU 301 updates the determination result in step S1106 in the manner as described above, the processing proceeds to step S1107. In the other cases, the processing proceeds to step S1108.

In step S1107, the CPU 301 performs display based on the processing result in step S1106 on the screen of the display unit 307. The display based on the processing result is similar to display processing performed by the client apparatus 120 which has received information about the processing result from the camera 110 according to the first embodiment described above.

Meanwhile, in the processing of step S1108 to be performed if no target object is detected in step S1103, or if the determination result is not updated in step S1106, the CPU 301 transmits, to the camera 110, a request for deleting the held RAW image. The camera 110 deletes the image in response to the deletion request. The image deletion processing in the camera 110 is similar to the image deletion processing performed in steps S507 or S508 described above.

With the above described processing, also according to the third embodiment, the camera 110 does not store unnecessary data, and thus can reduce the occupied capacity of the memory or the like and can smoothly perform the subsequent processing. In addition, since the client apparatus 120 does not receive unnecessary data, the amount of processing can be reduced and the occupied capacity of the memory can also be reduced.

Also, in the client apparatus 120 according to the third embodiment, color determination results and images used for determination may be stored in an SD card or the like. For example, when a plurality of determination results is obtained for the same object, an image with a largest determined area, an image with a highest resolution, and an image with a highest degree of coincidence in the shape with preliminarily registered data may be selected and stored. In this case, images that have not been selected can be deleted by transmitting the deletion request to the camera 110. By these processes, more accurate information can be maintained while the amount of data is suppressed.

Further, in the client apparatus 120, a color profile corresponding to color conversion in step S502 is simultaneously acquired and a display apparatus that supports a wide color gamut is used as the display unit 307, to make it possible to reproduce the determined image more accurately. In addition, for example, by storing a set of a color profile and an acquired image, a color difference in the standard color space can be checked and a difference between a plurality of cameras can be accommodated.

Furthermore, according to the present embodiment, the client apparatus 120 performs object detection and color determination processing and the like, to thereby eliminate the need for the camera 110 to include the detection function and reducing the cost of the apparatus.

In the first to third embodiments, a coin is detected by matching or via a user's designation, while in other embodiments, the face of a specific human figure for example may be preliminarily registered, and when the human figure is detected by a camera, coin detection processing for detecting a coin in the vicinity of the human figure may be started.

In addition to the RAW image of the coin 601 in the captured image 600 recorded when the coin is determined to be fake, the captured image and the detection result as illustrated in FIG. 10C may also be recorded as a still image. Thus, when the coin is determined to be fake, the status in the vicinity area can be checked without the need for rewinding the moving image.

In the dictionary data 610 in which the type of each coin and a variation in the orientation of various coins are registered, the variation range A of R, G, and B values in the color space can also be registered for each of the camera setting conditions such as an exposure condition and WB. As a result, comparison processing for the coins which have been captured and detected can be performed depending on the camera setting conditions, which leads to a reduction in erroneous determination results due to lighting conditions or the like. While the variation range A may be preliminarily registered in the dictionary data for each camera setting condition as described above, the captured image may be corrected based on the camera setting conditions and may be compared with the dictionary data.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. It will of course be understood that this invention has been described above by way of example only, and that modifications of detail can be made within the scope of this invention.

This application claims the benefit of Japanese Patent Applications No. 2018-037295, filed Mar. 2, 2018, and No. 2019-012304, filed Jan. 28, 2019, which are hereby incorporated by reference herein in their entirety.

What is claimed is:

1. An image processing apparatus comprising at least one processor and/or circuit configured to function as following units:
   a conversion unit configured to convert an image in a first color space into an image in a second color space in such a manner that the image in the second color space has a bit depth smaller than a bit depth of the image in the first color space;
   a first recognition unit configured to perform first recognition processing using the image in the second color space;
   a control unit configured to determine an image area in which second recognition processing is to be performed on the image in the first color space, based on a result of the first recognition processing; and a second recognition unit configured to perform the second recognition processing on the determined image area of the image in the first color space.

2. The image processing apparatus according to claim 1, wherein the control unit is configured to control whether the second recognition processing is executed based on the result of the first recognition processing.

3. The image processing apparatus according to claim 2, further comprising a storage unit configured to store the image in the first color space,
wherein in a case where the control unit determines not to execute the second recognition processing based on the result of the first recognition processing, the control unit is configured to delete, from the storage unit, the image in the first color space which has been determined that the second recognition processing is not to be executed.

4. The image processing apparatus according to claim 1, further comprising a communication unit configured to communicate with an external apparatus,
wherein the control unit is configured to associate the image in the second color space with a result of the second recognition processing and to transmit the image in the second color space and the result of the second recognition processing to the external apparatus via the communication unit.

5. The image processing apparatus according to claim 4, further comprising a storage unit configured to store the image in the first color space,
wherein in a case where the control unit determines not to execute the second recognition processing, based on the result of the first recognition processing, the control unit is configured to delete, from the storage unit, the image in the first color space, and
wherein in a case where the control unit determines to execute the second recognition processing based on the result of the first recognition processing, the control unit is configured to delete, from the storage unit, the image in the first color space on which the second recognition processing has been executed, after the result of the second recognition processing executed on the determined image area is transmitted in response to a notification from the external apparatus.

6. The image processing apparatus according to claim 5, wherein the storage unit stores the result of the second recognition processing corresponding to a plurality of frames together with an image in the first color space corresponding to each of the plurality of frames,
wherein the control unit is configured to select at least one frame based on the result of the second recognition processing on the plurality of frames, and
wherein the result of the second recognition processing of the selected frame is transmitted to the external apparatus via the communication unit.

7. The image processing apparatus according to claim 4, wherein the communication unit is configured to transmit a color conversion profile to be used for the conversion unit to the external apparatus.

8. An image processing apparatus comprising:
an acquisition unit configured to store a captured image in a first color space and acquire an image in a second color space from an image capturing apparatus, the image in the first color space having been converted into the image in the second color space in such a manner that the image in the second color space has a bit depth smaller than a bit depth of the image in the first color space;
a first recognition unit configured to perform first recognition processing using the image in the second color space acquired from the image capturing apparatus;
a control unit configured to request the image capturing apparatus to transmit the image in the first color space based on a result of the first recognition processing; and
a second recognition unit configured to perform second recognition processing on the image in the first color space acquired from the image capturing apparatus in response to the request.

9. The image processing apparatus according to claim 8, wherein the control unit is configured to determine an image area in which the second recognition processing is to be performed on the image in the first color space based on the result of the first recognition processing, and
wherein the second recognition unit is configured to perform the second recognition processing on the determined image area of the image in the first color space.

10. The image processing apparatus according to claim 8, wherein the control unit is configured to request the image capturing apparatus to transmit the image in the first color space corresponding to the image in the second color space on which the first recognition processing has been performed.

11. The image processing apparatus according to claim 8, wherein the control unit is configured to control whether the second recognition processing is executed based on the result of the first recognition processing.

12. The image processing apparatus according to claim 11, wherein in a case where second recognition processing is not performed, the control unit is configured to request the image capturing apparatus to delete the image in the first color space which has been determined that the second recognition processing is not to be executed.

13. The image processing apparatus according to claim 1, wherein the first recognition processing is processing for detecting a predetermined object from the image in the second color space.

14. The image processing apparatus according to claim 1, wherein the second recognition processing is processing for acquiring a color difference from the image in the first color space.

15. An image processing method to be executed by an image processing apparatus, the image processing method comprising:
converting an image in a first color space into an image in a second color space in such a manner the image in the second color space has a bit depth smaller than a bit depth of the image in the first color space;
performing first recognition processing using the image in the second color space;
performing control to determine an image area in which second recognition processing is to be performed on the image in the first color space, based on a result of the first recognition processing; and
performing the second recognition processing on the determined image area of the image in the first color space.

16. An image processing method comprising:
storing a captured image in a first color space and acquiring an image in a second color space from an image capturing apparatus configured to convert the image in the first color space into the image in the second color space in such a manner that the image in the second color space has a bit depth smaller than a bit depth of the image in the first color space;

performing first recognition processing using the image in the second color space acquired from the image capturing apparatus;

requesting the image capturing apparatus to transmit the image in the first color space based on a result of the first recognition processing; and performing second recognition processing on the image in the first color space acquired from the image capturing apparatus in response to the request.

17. A non-transitory computer-readable storage medium storing a program for causing a computer to execute following steps comprising:

converting an image in a first color space into an image in a second color space in such a manner that the image in the second color space has a bit depth smaller than a bit depth of the image in the first color space;

performing first recognition processing using the image in the second color space;

performing control to determine an image area in which second recognition processing is to be performed on the image in the first color space, based on a result of the first recognition processing; and performing the second recognition processing on the determined image area of the image in the first color space.

18. A non-transitory computer-readable storage medium storing a program for causing a computer to execute following steps comprising:

storing a captured image in a first color space and acquiring an image in a second color space from an image capturing apparatus configured to convert the image in the first color space into the image in the second color space in such a manner that the image in the second color space has a bit depth smaller than a bit depth of the image in the first color space;

performing first recognition processing using the image in the second color space acquired from the image capturing apparatus;

requesting the image capturing apparatus to transmit the image in the first color space based on a result of the first recognition processing; and performing second recognition processing on the image in the first color space acquired from the image capturing apparatus in response to the request.

* * * * *